United States Patent [19]

LeBell et al.

[11] 4,369,937
[45] Jan. 25, 1983

[54] HINGING AND LATCHING APPARATUS

[75] Inventors: Clarence E. LeBell, Peabody, Mass.; Samuel R. Barr, Sr., deceased, late of Swampscott, Mass., by Samuel R. Barr, Jr., administrator

[73] Assignee: The United States of America as represented by the Secretary of the Army, Washington, D.C.

[21] Appl. No.: 264,268

[22] Filed: May 18, 1981

[51] Int. Cl.³ ............................................. B64D 29/06
[52] U.S. Cl. ................................ 244/53 R; 244/17.11; 244/54; 239/127.3; 16/366; 292/113
[58] Field of Search .................... 244/17.11, 53 R, 54, 244/129.4; 60/264, 266; 239/127.3; 16/366; 292/113, DIG. 39, DIG. 40, DIG. 49

[56] References Cited

U.S. PATENT DOCUMENTS

| 2,695,803 | 11/1954 | Summers | 292/113 |
| 4,002,024 | 1/1977 | Nye et al. | 239/127.3 |
| 4,049,220 | 9/1977 | Rodgers | 244/53 R |

FOREIGN PATENT DOCUMENTS 290678 1/1980 U.S.S.R. ............................. 244/53 R

*Primary Examiner*—Charles E. Frankfort
*Attorney, Agent, or Firm*—Nathan Edelberg; Robert P. Gibson; Norman L. Wilson, Jr.

[57] ABSTRACT

A latching system for an infrared suppression device, which reduces the infrared signature of the exhaust of a gas turbine engine, employs a two-point hinge for supporting and swivelling the IR suppressor and for permitting the IR suppressor to be translated forward and backward a substantial distance in order to complete the latching operation. Guide pins entering guide holes and held in firm engagement therebetween by retractable hooks engaging loops, support the forward end of the suppressor to the aft end of the gas turbine engine while resisting lateral and twisting displacement of the suppressor when it is latched in place.

12 Claims, 5 Drawing Figures

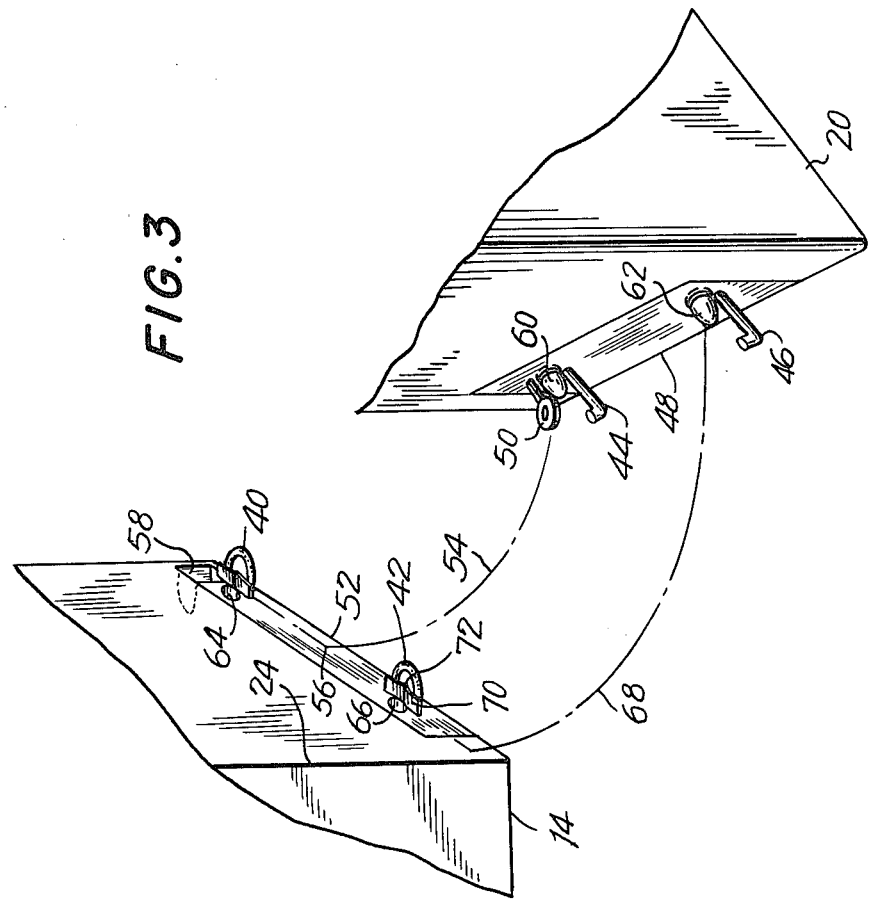
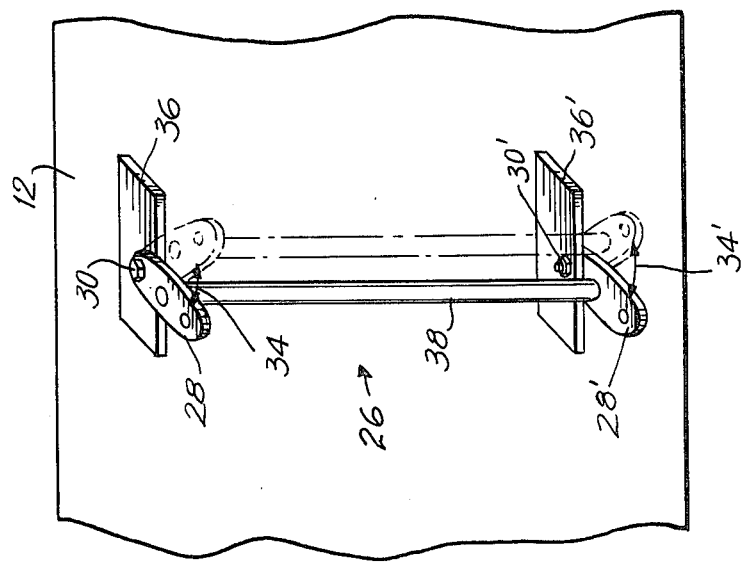

HINGING AND LATCHING APPARATUS

BACKGROUND OF THE INVENTION

The present invention relates to hinging and latching mechanism and, more particularly, to hinging and latching mechanisms for supporting and securing an infrared suppressor to the aft end of a gas turbine engine.

In gas turbine engines used in helicopters, it is desirable to employ some means for reducing the infrared signature of the exhaust of the engine. This tends to reduce the vulnerability of the aircraft to ground fire from infrared-seeking missiles.

Infrared suppression devices have been developed which permit the exhaust gases from the gas turbine engine to expand considerably before being vented to the atmosphere. This tends to reduce the exhaust gas temperature and to reduce the temperature of material near the exhaust opening. Furthermore, the exhaust opening itself can be redirected to locations which make it less vulnerable to hostile fire. For example, it is particularly desirable to relocate the gas turbine engine exhaust from its previous position directly aft. In this undesirable aft position, an excellent relatively angularly stationary target for portable infrared-seeking weapons was presented. Side-discharge and top-discharge infrared suppressors have improved the situation considerably. In addition, some infrared suppressors provide an auxiliary air intake which permits the mixing of cooler ambient air into the turbine engine exhaust prior to discharging the exhaust into the atmosphere. This further reduces the infrared signature but increases the bulk of the apparatus considerably.

In order to provide a secure attachment of the infrared suppressor, it has been found desirable to bring a forward end of the infrared suppressor into a facing relationship with the aft end or firewall of the gas turbine engine compartment and then to move the forward end of the suppressor linearly into contact with a gasket which is thereupon compressed to produce a sealed joint around the gas path. A complex set of motions including rotation and translation of the infrared suppressor is, therefore, needed to complete the fitting together and attachment of this suppressor with the engine.

OBJECTS AND SUMMARY OF THE INVENTION

Accordingly, it is an object of the present invention to provide a latch system for an infrared suppressor which overcomes the drawbacks of the prior art.

More specifically, it is an object of the present invention to provide a latch system for an infrared suppressor which provides hinging and guide elements enabling the lining up of latch members and then permitting the infrared suppressor to be translated into sealing relationship with the aft end of a gas turbine engine.

It is a further object of the invention to provide a hinging and latch mechanism for an infrared suppressor which permits releasing and hinging the infrared suppressor away from the aft end of a gas turbine engine to permit inspection and service access to parts in the aft end of the gas turbine engine. The apparatus further includes means for guiding the forward end of the infrared suppressor in the fore-and-aft directions to align latching element before the final latching operation is performed.

According to an aspect of the present invention, there is provided an apparatus for mounting an infrared suppressor to an aircraft and for mating a first end of the infrared suppressor to a second end of an engine comprising hinge means for attaching the infrared suppressor to the aircraft, the hinge means including means for supporting and permitting the infrared suppressor to be rotated on an axis away from the second end whereby the second end is made accessible, the hinge means further including means permitting the first end to be rotated into alignment with the second end and further permitting generally linear translation of the infrared suppressor into mating engagement of the first end with the second end, and means for maintaining a predetermined minimum spacing of the first end from the second end during rotation of the infrared suppressor into alignment.

According to a further aspect of the present invention, there is provided an apparatus for mounting an infrared suppressor to an aircraft and for mating a first end of the infrared suppressor to a second end of an engine comprising first and second spaced apart straps, a synchronizing bar rigidly joining the straps, the first and second straps each having a first pivot at a first end thereof affixed at a first axis to the aircraft, axes of the first pivots being aligned, the first and second straps each having a second pivot at a second end thereof affixed to the infrared suppressor, axes of the second pivots being aligned, the infrared suppressor being rotatable about axes of the second pivots and being generally linearly displaceable by rotation of the first and second straps about axes of the first pivots, rotation about axes of the second pivots permitting the infrared suppressor to be rotated away from the second end whereby the second end is made accessible, and permitting the first end to be rotated into alignment with the second end, rotation about axes of the first pivots permitting generally linear translation of the infrared suppressor into mating engagement of the first end with the second end, a roller extending from the first end and a track on the second end, the roller being engageable for rolling on the track during rotation of the first end into alignment with the second end whereby a predetermined minimum spacing between the first and second ends is maintained, at least one loop on one of the first and second ends and at least one hook on the other of the first and second ends, means for displacing the at least one hook between first and second longitudinal extensions, the means for displacing being further effective to engage the at least one hook with the at least one loop at the first longitudinal extension, the at least hook being effective during displacement to the second longitudinal extension for the pulling the first and second ends into mating engagement and being further effective at the second longitudinal extension to hold the mating engagement, at least one guide pin in one of the first and second ends, at least one guide hole in the other of the first and second ends, the guide pin being aligned with the guide hole when alignment of the first and second ends is attained and the guide pin entering the guide hole when the mating engagement is achieved, and the guide pin and guide hole being effective to carry loads transverse to a direction of the translation.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a partial view of the side of a helicopter showing a two-point hinge suitable for use in the present invention from which the infrared suppressor has been omitted to reveal details of the two-point hinge.

FIG. 3 shows a perspective view of the aft end of a gas turbine engine and the forward end of an infrared suppressor and shows a guided trajectory of parts attached to the infrared suppressor during alignment of the infrared suppressor with the aft end of the gas turbine engine.

DETAILED DESCRIPTION OF THE PREFERRED EMBODIMENT

Figure 1:
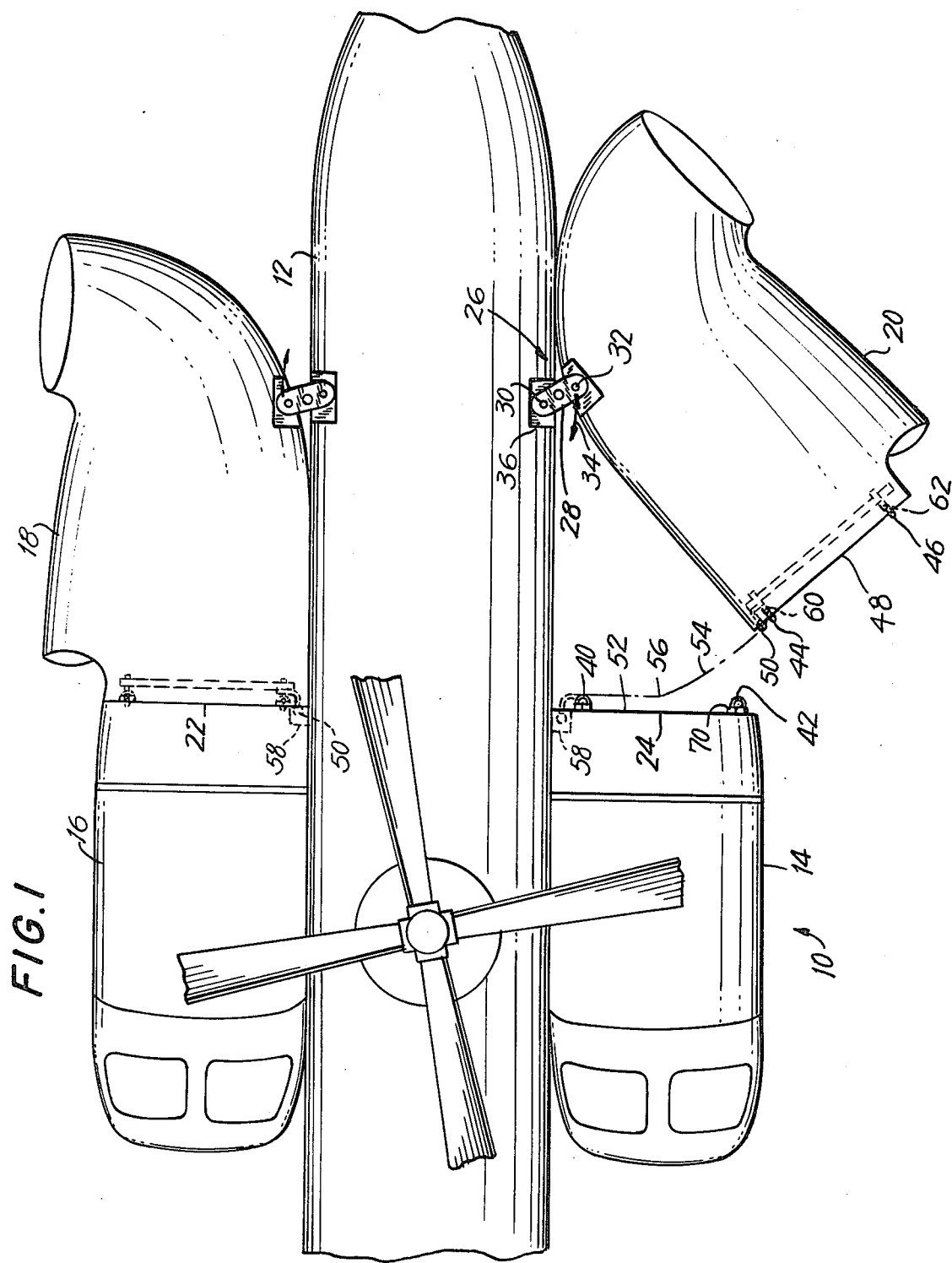
FIG. 1 is a top view of a portion of a helicopter including a hinging and latching mechanism according to an embodiment of the present invention.

Referring now to FIG. 1, there is shown a partial overhead view of a helicopter 10, having a body 12 to which are affixed left and right gas turbine engines 14 and 16. For infrared (IR) suppression of exhaust from left and right gas turbine engines 14 and 16, IR suppressor assemblies 18 and 20 are mated with aft ends 22 and 24 of left and right gas turbine engines 14 and 16, respectively.

In order to permit access to the aft ends 22 and 24, IR suppressors 18 and 20 are arranged to move backward and swing away from aft ends 22 and 24 in the manner illustrated for IR suppressor 20. The backward movement and rotation of IR suppressor 20 is permitted by a two-point hinge shown generally at 26. Two-point hinge 26 includes a strap 28 pivoted to body 12 at a first pivot 30 and pivoted to IR suppressor 20 at a second pivot 32. This arrangement permits second pivot 32 to be moved backward and forward as indicated by a double-headed arrow 34.

Referring momentarily to FIG. 2, two-point hinge 26 is shown in greater detail with IR suppressor 20 omitted to permit showing parts otherwise hidden. Top and bottom mounting flanges 36 and 36' affixed to body 12 provide means for pivoting top and bottom straps 28 and 28' at corresponding pivots 30 and 30'. A synchronizing bar 38 is rigidly affixed between top and bottom straps 28 and 28' to ensure that rotation of upper strap 28 indicated by double-headed arrow 34 is synchronized with, and equal to motion of lower strap 28' indicated by double-headed arrow 34'.

Returning now to FIG. 1, aft end 24 or firewall of left gas turbine engine 14 includes a pair of loops 40 and 42 which are respectively engaged by corresponding hooks 44 and 46 of a latching apparatus to be more fully described hereinafter. Due to the ability of two-point hinge 26 to permit backward and forward translation of IR suppressor 20, an apparatus is provided for guiding a forward end 48 of IR suppressor 20 during reassembly and fastening of IR suppressor 20 to aft end 24. Part of such guiding apparatus includes a roller 50 on IR suppressor 20 and a track 52 across the exposed aft end 22 of left turbine engine 14.

If IR suppressor 20 is swung into alignment with left gas turbine engine 14 while two-point hinge 26 is in its forward position, roller 50 describes a trajectory shown by a dashed line 54 wherein it follows a curving pass until makes contact with track 52 at a contact point 56 and then follows a straight pass along track 52 thereby establishing and maintaining the proper spacing between forward end 48 and aft end 24 while IR suppressor 20 is rotated into a position wherein hooks 44 and 46 are aligned for engagement with loops 40 and 42, respectively. As will be made clear hereinafter, hooks 44 and 46 are retracted after engagement with loops 40 and 42 to pull IR suppressor 20 forward a substantial amount such as, for example, about 1.5 inches and thereby to compress a resilient sealing material to seal the junction against loss of gas. In order to provide relief for roller 50 when IR suppressor 20 is pulled forward in this way, a well 58 is provided beyond the end of track 52.

Since IR suppressors 18 and 20 are identical except for handedness, only the attachment and operation of IR suppressor 20 is described in detail.

Referring now to FIG. 3, IR suppressor 20 is further seen to include first and second guide pins 60 and 62 which preferably have ogive-shaped forward ends projecting forward from forward end 48. Although other arrangements are possible, guide pins 60 and 62 are seen to be generally respectively aligned with hooks 44 and 46.

First and second guide holes 64 and 66 are provided in aft end 24 for respective engagement by guide pins 60 and 62 during the final stages of latching IR suppressor 20 in place. Pin 62, for example, follows a trajectory shown by dashed line 68 on a curving line until roller 50 contacts at 52 and is then maintained spaced from aft end 24 an appropriate distance while it is translated laterally into alignment with guide hole 66. In order to further assist the alignment of guide pin 62 with guide hole 66, a flange 70 supports guide pin 62 in the last few inches of its transition. A positioning groove 72 functions as a detent engaged by guide pin 62 to indicate that guide pin 62 is centered in front of guide hole 66. At that point, engagement of hooks 44 and 46 with loops 40 and 42 followed by retraction of hooks 44 and 46 draws IR suppressor 20 forward thus inserting guide pins 60 and 62 into guide holes 64 and 66 respectively with roller 50 entering well 58. Thereafter, longitudinal forces tending to separate IR suppressor 20 from gas turbine engine 14 are resisted by tension in hooks 44 and 46. Transverse and twisting forces are applied in shear to pins 60 and 62 which resist displacement in these directions. Thus, stable and secure attachment of forward end 48 of IR suppressor 20 to aft end 24 of gas turbine engine 14 is achieved.

Figure 4:
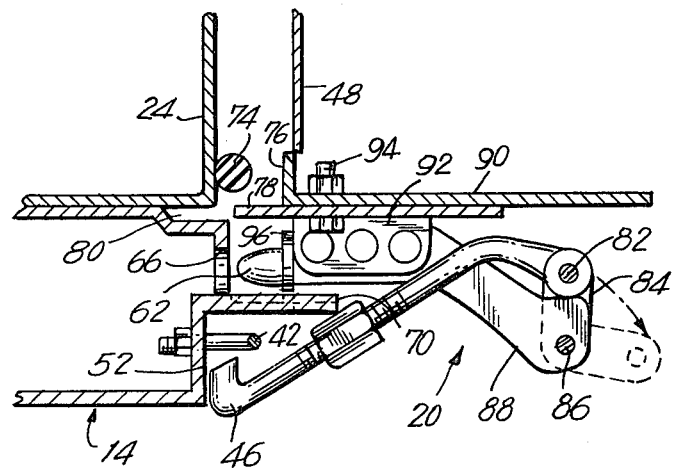
FIG. 4 is a cross sectional close-up view of a portion of the latch mechanism shown aligned but before latching.
Figure 5:
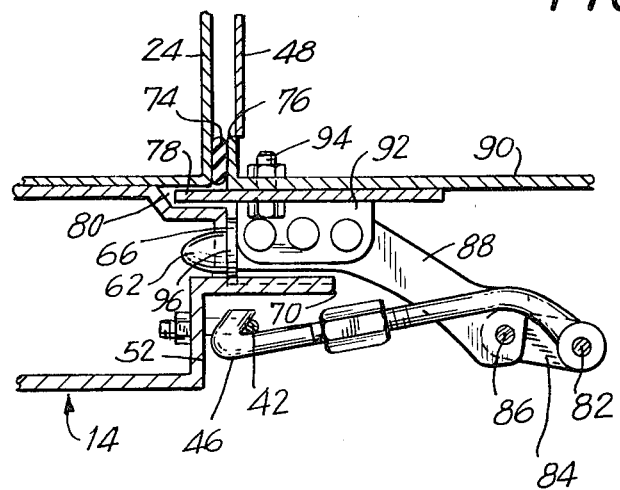
FIG. 5 is a view similar to FIG. 4 in which latching has been completed.

Referring now to FIGS. 4 and 5, a latching mechanism is shown in greater detail. Although certain lever and camming elements for actuating the parts shown are required, such mechanisms are conventional and their description in full would merely impede understanding of the present invention.

FIG. 4 shows forward end 48 of IR suppressor 20 in the final stages of alignment with aft end 24 of gas turbine engine 14. A resilient sealing gasket 74 makes a closed figure on aft end 24 facing a flange 76 on forward end 48. A lip 78 faces a groove 80. As will be illustrated and described hereinafter, as hook 46 is retracted and pulls against loop 42, flange 76 is forced into engagement and compresses gasket 74 while lip 78 moves inside groove 80 to both stabilize the fit and further guard against the leakage of exhaust gases directly outward from the joint.

The aft end of hook 46 is pivoted on a pivot 82 to a link 84. The opposed end of link 84 is pivoted by a pivot 86 to a support member 88 which is, in turn, rigidly affixed to a floor plate 90 of IR suppressor 20 by any convenient means such as by a bracket 92 affixed to floor plate 90 by any convenient means such as, for example, by bolts 94. Link 84 is rotatable by convenient camming action from the position shown in full line to the position shown in dashed line to rotate pivot 82 from its full line to its dashed line position. When this motion takes place after engagement of hook 46 with loop 42, the resulting reaction acting through floor plate 90 urges guide pin 62 forward into guide hole 66 until further forward motion is stopped by engagement of a flange 96 on guide pin 60 with the perimeter of guide hole 66. It is to be noted that the final geometry of loop 42, pivot 82 and pivot 86 is over-center. That is, a straight line joining the final position of pivot 82 with the contact point on loop 42 falls below the center of pivot 86. This geometry tends to hold the latched condition even when the camming action which produced the geometry is removed. This is particularly important in a military aircraft where external damage or hostile action may destroy part of the apparatus. With the geometry shown, the latching action secured by one of the hook and loop attachment devices may be effective to continue holding IR suppressor 20 in place even if the other one is shot away. The latched condition of the apparatus as shown in FIG. 5 wherein gasket 74 is compressed against flange 76, guide pin 62 is fully inserted into guide hole 66 and hook 46 is in its latched condition.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for mounting an infrared suppressor to an aircraft and for mating a first end of said infrared suppressor to a second end of an engine comprising:
    hinge means for attaching said infrared suppressor to said aircraft;
    said hinge means including means for supporting and permitting said infrared suppressor to be rotated on an axis away from said second end whereby said second end is made accessible;
    said hinge means further including means permitting said first end to be rotated into alignment with said second end and further permitting generally linear translation of said infrared suppressor into mating engagement of said first end with said second end; and
    means for maintaining a predetermined minimum spacing of said first end from said second end during rotation of said infrared suppressor into alignment.

2. Apparatus according to claim 1, wherein said means for maintaining a predetermined minimum spacing includes a roller extending from said first end and a track on said second end, said roller being engageable for rolling on said track during rotation of said first end into alignment with said second end whereby said predetermined minimum spacing is maintained.

3. Apparatus according to claim 2, wherein said roller follows an arcuate trajectory during a first portion of rotating said first end into alignment until said roller contacts said track, thereafter said roller follows a transverse linear trajectory.

4. Apparatus according to claim 3, wherein said second end includes a well disposed adjacent said roller when said alignment is attained and said well is effective to contain said roller when said mating engagement is achieved.

5. Apparatus according to claim 1, further comprising:
    latching means for producing latching engagement between said first and second ends; and
    said latching means including means for pulling said infrared suppressor in said generally linear translation and for holding said first and second ends in said mating engagement.

6. Apparatus according to claim 5, wherein said latching means including at least one loop on one of said first and second ends and at least one hook on the other of said first and second ends, and means for displacing said at least one hook between first and second longitudinal extensions, said means for displacing being further effective to engage said at least one hook with said at least one loop at said first longitudinal extension, said at least hook being effective during displacement to said second longitudinal extension to perform said pulling and being further effective at said second longitudinal extension to perform said holding.

7. Apparatus according to claim 6, wherein said means for holding includes an overcenter geometry effective to tend to hold said at least one hook at said second extension.

8. Apparatus according to claim 1 or 5, further comprising at least one guide pin in one of said first and second ends and at least one guide hold in the other of said first and second ends, said guide pin being aligned with said guide hole when alignment of said first and second ends is attained and said guide pin entering said guide hole when said mating engagement is achieved, said guide pin and guide hole being effective to carry loads transverse to a direction of said translation.

9. Apparatus according to claim 1, further comprising at least one guide pin in one of said first and second ends and at least one guide hole in the other of said first and second ends, said guide pin being aligned with said guide hole when alignment of said first and second ends is attained and said guide pin entering said guide hole when said mating engagement is achieved, said guide pin and guide hole being effective to carry loads transverse to a direction of said translation, a flange below said guide hole, said flange being effective to support said pin during a final stage of said alignment and a longitudinal groove in said flange aligned with an axis of said guide hole, said longitudinal groove being effective as a detent to finally substantially align an axis of said guide pin with an axis of said guide hole.

10. Apparatus according to claim 1, wherein said hinge means includes first and second spaced apart straps, said straps being rigidly joined by a synchronizing bar, said first and second straps each having a first pivot at a first end thereof affixed at a first axis to said aircraft, axes of said first pivots being aligned, said first and second straps each having a second pivot at a second end thereof affixed at a second axis to said infrared suppressor, axes of said second pivots being aligned, said infrared suppressor being rotatable about axes of said second pivots and being generally linearly displaceable by rotation of said first and second straps about axes of said first pivots.

11. Apparatus for mounting an infrared suppressor to an aircraft and for mating a first end of said infrared suppressor to a second end of an engine comprising:

first and second spaced apart straps;

a synchronizing bar rigidly joining said straps;

said first and second straps each having a first pivot at a first end thereof affixed at a first axis to said aircraft;

axes of said first pivots being aligned;

said first and second straps each having a second pivot at a second end thereof affixed to said infrared suppressor;

axes of said second pivots being aligned;

said infrared suppressor being rotatable about axes of said second pivots and being generally linearly displaceable by rotation of said first and second straps about axes of said first pivots;

rotation about axes of said second pivots permitting said infrared suppressor to be rotated away from said second end whereby said second end is made accessible, and permitting said first end to be rotated into alignment with said second end;

rotation about axes of said second pivots permitting generally linear translation of said infrared suppressor into mating engagement of said first end with said second end;

a roller extending from said first end and a track on said second end;

said roller being engageable for rolling on said track during rotation of said first end into alignment with said second end whereby a predetermined minimum spacing between said first and second ends is maintained;

at least one loop on one of said first and second ends and at least one hook on the other of said first and second ends;

means for displacing said at least one hook between first and second longitudinal extensions;

said means for displacing being further effective to engage said at least one hook with said at least one loop at said first longitudinal extension;

said at least one hook being effective during displacement to said second longitudinal extension for pulling said first and second ends into mating engagement and being further effective at said second longitudinal extension to hold said mating engagement;

at least one guide pin in one of said first and second ends;

at least one guide hole in the other of said first and second ends;

said guide pin being aligned with said guide hole when alignment of said first and second ends is attained and said guide pin entering said guide hole when said mating engagement is achieved; and said guide pin and guide hole being effective to carry loads transverse to a direction of said translation.

12. Apparatus according to claim 11, further comprising a flange below said guide hole, said flange being effective to support said pin during a final stage of said alignment and a longitudinal groove in said flange aligned with an axis of said guide hole, said longitudinal groove being effective as a detent to finally substantially align an axis of said guide pin with an axis of said guide hole.

* * * * *